R. A. MacDONALD.
COMBINATION GREASE STRAINER AND RECEPTACLE.
APPLICATION FILED MAY 2, 1917.
1,267,885.
Patented May 28, 1918.
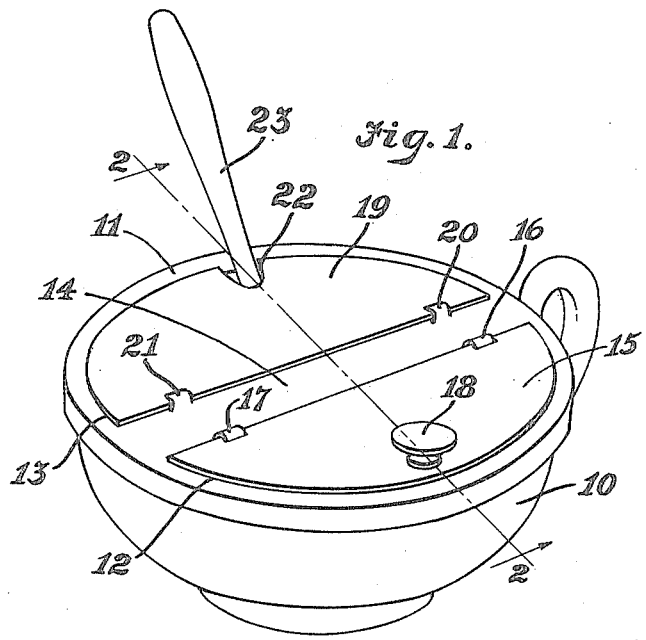
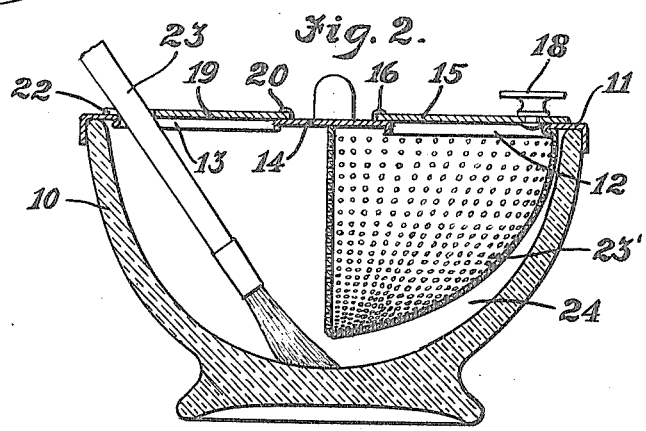
Inventor
Rosa A. MacDonald
by Hazard & Miller
Att'ys.

UNITED STATES PATENT OFFICE.

ROSA A. MacDONALD, OF LOS ANGELES, CALIFORNIA.

COMBINATION GREASE STRAINER AND RECEPTACLE.

1,267,885.　　　　　Specification of Letters Patent.　　Patented May 28, 1918.

Application filed May 2, 1917. Serial No. 165,960.

*To all whom it may concern:*

Be it known that I, ROSA A. MACDONALD, a citizen of the United States, residing at Los Angeles, in the county of Los Angeles and State of California, have invented new and useful Improvements in Combination Grease Strainers and Receptacles, of which the following is a specification.

This invention relates to a kitchen utensil, and particularly pertains to a combined grease receptacle and strainer.

It is often desirable to re-use grease which has been previously used in frying articles of food, and it is the principal object of this invention to provide a receptacle within which this grease may be poured, and by which it may be strained so that particles of foreign substance will be removed and the grease may be used again.

Another object of this invention is to provide a combined strainer and cover which may be detachably positioned over the mouth of a suitable receptacle and which will adapt the utensil for use as above described.

It is a further object of this invention to provide a utensil of the above class which is simple in its construction, may be formed of inexpensive material, and easily assembled.

Other objects will appear hereinafter.

The invention is illustrated, by way of example, in the accompanying drawings in which:

Figure 1 is a view in perspective illustrating the utensil, as assembled.

Fig. 2 is a view in transverse section as seen on the line 2—2 of Fig. 1, more closely disclosing the formation of the utensil and the disposition of the strainer and its cover thereover.

Referring more particularly to the drawings, 10 indicates a bowl, here shown as formed of earthenware, and over which a rim 11 is positioned. This rim is circular to correspond to the configuration of the bowl and is fitted with a downwardly extending flange which over-hangs the edge of the bowl and holds the rim in position. Semi-circular openings 12 and 13 are formed though the rim and are arranged symmetrically on each side of the central rib 14 which is formed integral with the rim. The opening 12 is provided with a cover 15 which is fastened to the central rib 14 by hinges 16 and 17. A knob 18 is mounted upon this cover and will permit it to be raised. The opening 13 is provided with a cover 19, which is fastened to the central rib by means of hinges 20 and 21. This cover has an open-ended slot 22 in its periphery and is adapted to provide clearance for the handle of a grease brush 23.

Mounted within the bowl and secured along one side of the rim 11 and beneath the reinforcing rib 14 is a strainer 23'. This strainer is formed of thin sheet metal through which a plurality of small perforations are made. As particularly shown in Fig. 2, the strainer represents a quarter of a sphere having straight planes, one of which coincides with the cover, and the other being at right-angles thereto. This second plane, or wall is vertical and is fastened beneath the reinforcing rib 14, and extends longitudinally along the center thereof. The arc by which the circumferential wall of the strainer is described is less than the arc of the interior of the utensil, thus forming a clearance space, as indicated by the numeral 24, which will permit the grease which runs through the perforations in the sieve to readily flow to the bottom of the utensil and thereby prevent the clogging of the sieve.

In operation, melted grease or oil is poured through the opening 12 into the strainer 23'. This liquid fuel may be partially mixed with solid substance, and when the entire quantity is poured into the strainer, the free liquid will flow out through the openings into the bowl and the parts of solid matter will be retained. After the grease has been poured into the strainer, the cover 15 may be closed and the cover 19 may be opened so that the grease brush 23 can be dipped into the strained grease and used in cooking.

It will thus be seen that the utensil here provided is simple in its construction, inexpensive in manufacture, and will conveniently receive and strain oils and greases used in cooking.

While I have shown the preferred form of my invention as now known to me, it is evident that various changes in the combination, construction and arrangement of parts may be made by those skilled in the art without departing from the spirit of my invention.

I claim:

A kitchen utensil, comprising a bowl, a lid rim detachably mounted upon said bowl, a pair of semi-circular openings formed through the lid member, complementary covers adapted to close said openings, a strainer mounted on said lid member and describing a quarter of a sphere, said strainer being disposed to catch liquid and solid materials entering the receptacle through one opening, and to retain the solid substance so that the liquid may be removed through the opposite opening.

In testimony whereof I have signed my name to this specification.

ROSA A. MacDONALD.